(12) United States Patent
Clauser et al.

(10) Patent No.: US 9,016,717 B1
(45) Date of Patent: Apr. 28, 2015

(54) CURTAIN AIRBAG FOR VERTICAL AND ANGULAR MOTION OF OCCUPANT IN ROLLOVER

(71) Applicant: Toyota Motor Engineering & Manufacturing North America, Inc., Erlanger, KY (US)

(72) Inventors: Mark Clauser, Saline, MI (US); Palaniappan Palaniappan, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/309,411

(22) Filed: Jun. 19, 2014

(51) Int. Cl.
| B60R 21/233 | (2006.01) |
| B60R 21/232 | (2011.01) |
| B60R 21/13 | (2006.01) |
| B60R 21/2338 | (2011.01) |
| B60R 21/00 | (2006.01) |
| B60R 21/231 | (2011.01) |

(52) U.S. Cl.
CPC ............ *B60R 21/233* (2013.01); *B60R 21/232* (2013.01); *B60R 21/13* (2013.01); *B60R 21/2338* (2013.01); *B60R 2021/0018* (2013.01); *B60R 2021/23192* (2013.01); *B60R 2021/23324* (2013.01); *B60R 2021/23386* (2013.01); *B60R 2021/23308* (2013.01)

(58) Field of Classification Search
USPC ............................................ 280/730.2, 730.1
IPC ...................................................... B60R 21/213
See application file for complete search history.

(56) References Cited

U.S. PATENT DOCUMENTS

| 3,603,535 A | 9/1971 | DePolo |
| 3,664,682 A | 5/1972 | Wycech |
| 5,265,903 A | 11/1993 | Kuretake et al. |
| 5,470,103 A * | 11/1995 | Vaillancourt et al. ...... 280/730.1 |
| 5,775,726 A | 7/1998 | Timothy et al. |
| 5,845,935 A | 12/1998 | Enders et al. |
| 6,123,355 A | 9/2000 | Sutherland |
| 6,338,498 B1 | 1/2002 | Niederman et al. |
| 6,457,740 B1 | 10/2002 | Vaidyaraman et al. |
| 6,481,743 B1 | 11/2002 | Tobe et al. |
| 7,581,750 B2 | 9/2009 | Hirata et al. |
| 8,033,569 B2 | 10/2011 | Yamanishi et al. |
| 8,550,494 B2 | 10/2013 | Ochiai et al. |
| 2013/0270805 A1 | 10/2013 | Kruse et al. |

FOREIGN PATENT DOCUMENTS

| DE | 19650940 A1 | 6/1998 |
| JP | 03276844 A | 12/1991 |
| JP | 09-254737 A | 9/1997 |
| JP | 2004249845 A * | 9/2004 .............. B60R 21/22 |
| JP | 2006306377 A * | 11/2006 |

* cited by examiner

*Primary Examiner* — Faye M Fleming
(74) *Attorney, Agent, or Firm* — Gifford, Krass, Sprinkle, Anderson & Citkowski, P.C.

(57) ABSTRACT

A side curtain-roof airbag for a motor vehicle is provided. The side curtain-roof airbag includes a side chamber, a roof chamber, and a corner chamber located between said side and roof chambers. In addition, the corner chamber is separate from the side and corner chambers when the side curtain-roof airbag is in a deployed position. The corner chamber is separate from the side and roof chambers via a chamber wall. Also, the chamber wall may or may not have a plurality of vents such that the corner chamber is in fluid communication with the side and roof chambers.

18 Claims, 6 Drawing Sheets

CURTAIN AIRBAG FOR VERTICAL AND ANGULAR MOTION OF OCCUPANT IN ROLLOVER

FIELD OF THE INVENTION

The present invention is related to a side curtain-roof airbag, and in particular to a side curtain-roof airbag that has three separate chambers.

BACKGROUND OF THE INVENTION

Motor vehicles with airbags are known. In addition, side curtain airbags that protect occupants from inside or interior impact collisions and contact with side windows and pillars of the vehicle are also known. Such airbags are commonly referred to as curtain airbags, side curtain airbags or curtain shield airbags. Also, an improved side curtain airbag that improves roll over protection would be desirable.

SUMMARY OF THE INVENTION

An airbag with a side curtain/chamber, a roof chamber and a corner chamber (hereafter referred to as a side curtain-roof airbag) for a motor vehicle is provided. The corner chamber is a chamber that is centrally located between the side and roof chambers and extends inwardly from a roof rail of the vehicle into the vehicle's interior. In addition, the corner chamber is separate from the side and corner chambers when the side curtain-roof airbag is in a deployed position. For the purposes of the present invention, the term "a deployed position" refers to the airbag in its fully inflated position or orientation as is known to those skilled in the art. Furthermore, it is appreciated that the airbag in its deployed position can be referred to as the airbag being "deployed."

The corner chamber is separate from the side and roof chambers via at least one chamber wall. Also, in some instances the at least one chamber wall has a plurality of vents that afford for gas to pass between the corner chamber and the side and/or roof chambers in a controlled manner. In other instances, the at least one corner chamber wall does not have any vents and gas is directly supplied to the corner chamber by at least one inflator.

For example, in one embodiment the at least one chamber wall does not have any vents and the side curtain-roof airbag has a separate inflator, i.e. three inflators, dedicated to supply gas to each of the side, roof and corner chambers. In another embodiment, the at least one chamber wall does not have any vents and the side curtain-roof airbag has a first inflator dedicated to supply gas to the side chamber and a second inflator that supplies gas to the roof and corner chambers. In still yet another embodiment, a chamber wall between the side chamber and the corner chamber does not have any vents and a single inflator supplies gas to the side, roof and corner chambers.

In addition to the above, the side curtain-roof airbag is designed and manufactured such that the corner chamber may or may not have a different internal pressure than an internal pressure within the side chamber and/or the roof chamber when the side curtain-roof airbag is deployed. For example, the pressure within the side chamber ($P_1$), roof chamber ($P_2$) and corner chamber ($P_3$) can obey the following relationships when the airbag is deployed: $P_3>P_1$ and $P_3>P_2$; $P_3>P_1$ and $P_3=P_2$; $P_3>P_1$ and $P_3<P_2$; or $P_3=P_1=P_2$.

The side curtain-roof airbag also has a tether extending or bridging between the side and roof chambers and thereby ensures that the corner chamber maintains a desired shape when the side curtain-roof airbag is in the deployed position. The tether also prevents penetration between the side, roof and/or corner chambers. In some instances, the tether is a plurality of tethers that bridge across the corner chamber and between the side and roof chambers. In other instances, the tether is a single tether that extends at least 50% of a length of the side curtain-roof airbag in a longitudinal direction. As such, the tether may or may not form a continuous surface between the side and roof chambers along the airbag's total length.

The side curtain-roof airbag can extend from a front-most pillar to a rear-most pillar of the vehicle. For example, the side curtain-roof airbag can extend form an A-pillar to a C-pillar of a sedan vehicle, or in the alternative, from the A-pillar to a D-pillar for an SUV and/or van vehicle.

The roof chamber of the side curtain-roof airbag extends in an inwardly direction within the motor vehicle when the airbag is deployed. Also, the roof chamber can extend at least to a lateral position that is vertically above an inner side of an occupant's head for an occupant that is sitting in a normal position on a motor vehicle seat within an interior of the vehicle. In the alternative, the roof chamber can extend to the center line of the vehicle interior.

The side curtain-roof airbag can also be included with other tethers, brackets, and the like that assist in the deployment of the airbag. For example, a jump bracket can be included, the jump bracket guiding the roof chamber in the inward direction during the deployment of the side curtain-roof airbag.

DETAILED DESCRIPTION OF THE INVENTION

A curtain airbag that has a side portion and roof portion is provided. The airbag also has a corner portion that is located between the side portion and the roof portion. More particularly, the side portion is in the form of a side chamber, the roof portion is in the form of a roof chamber and a corner chamber is present between the side and roof chambers. Also, the corner chamber is separate from and may or may not be in fluid communication with, the side and roof chambers via a plurality of apertures or vents within at least one chamber wall.

The side curtain-roof airbag includes one or more actuators that are operable to release gas into the airbag as is known to those skilled in the art. In addition, the design and manufacture of the side curtain-roof airbag is such that the corner chamber can have a different internal pressure than an internal pressure within the side chamber and/or the roof chamber when the airbag is deployed.

The side curtain-roof airbag also includes a tether that extends/bridges across or between the side and roof chambers in order to ensure that: (1) the side curtain-roof airbag deploys in a proper manner: (2) the corner chamber maintains a desired shape when the airbag is deployed; and (3) objects do not penetrate between the side, roof and/or corner chambers. The tether can be a plurality of tethers with each of the tethers bridging across the corner chamber between the side and roof chambers. In the alternative, the tether is a single tether that extends along a length of the side curtain-roof airbag in a longitudinal direction. For example, a single tether can extend at least 50% of the length of the side curtain-roof airbag. Other examples afford for the single tether to extend at least 75% of the side curtain-roof airbag length. In still other examples, the airbag has a first tether that extends at least 25% of a length of the side curtain-roof airbag and a second tether that extends at least 25% of the side curtain-roof airbag length. In still yet other examples, the air bag has three tethers that each extend between 20-30% of the side curtain-roof airbag length.

The one or more tethers can provide a continuous surface between the side and roof chambers. As such, and for example, the one or more tethers can provide a continuous surface between the side and roof chambers along the at least 50% of the length of the side curtain-roof airbag.

Naturally, the roof chamber extends in an inwardly direction from a side portion or roof rail of the motor vehicle towards a centerline of the vehicle when deploying and when the airbag is in a deployed position. The roof chamber can extend inwardly to a centerline of the vehicle, or in the alternative, at least to a position that is directly over an inboard edge of the head of an occupant sitting in a normal position in the motor vehicle on the side of the deployed airbag. In this manner, the side curtain-roof airbag disclosed herein provides protection to an individual with respect to side windows, pillars, side rails and roof of the vehicle. In addition, the side curtain-roof airbag disclosed herein, and in particular the corner chamber, provides protection against a roof rail or corner portion that adjoins the side portion and roof portion of the vehicle. It is appreciated that coverage of the roof rail by the corner chamber is particularly advantageous in the event of a vehicle rollover.

Figure 1:
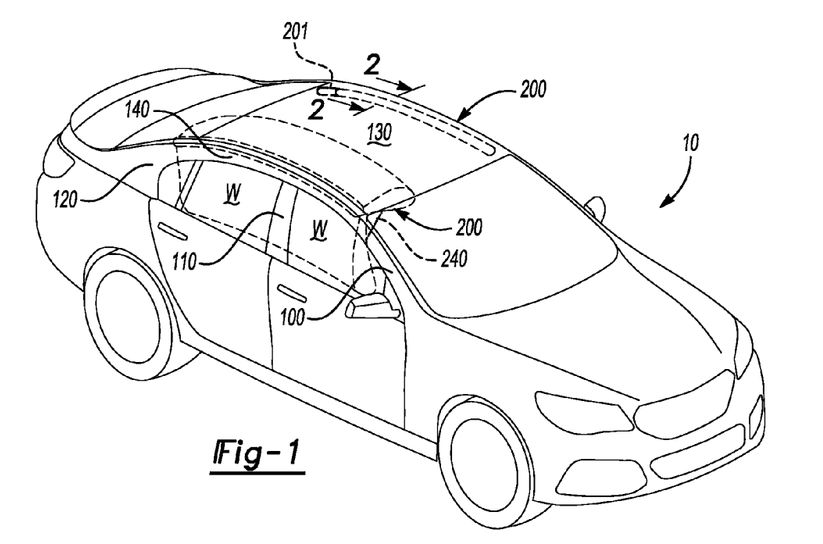
FIG. 1 is a perspective view showing the location of a pair of side curtain-roof airbags with one of the airbags in a deployed position according to an embodiment of the present invention.

Turning now to FIG. 1, a motor vehicle is shown generally at reference numeral 10, the motor vehicle 10 having a side curtain-roof airbag 200 with an actuator 201. The vehicle 10 can include an A-pillar 100, a B-pillar 110, and a C-pillar 120. Also, the vehicle has a roof 130 and a roof rail 140 that extends from the A-pillar 100 to the B-pillar 110, and the C-pillar 120. Also, and as known to those skilled in the art, the vehicle 10 has side windows W.

Figure 2:
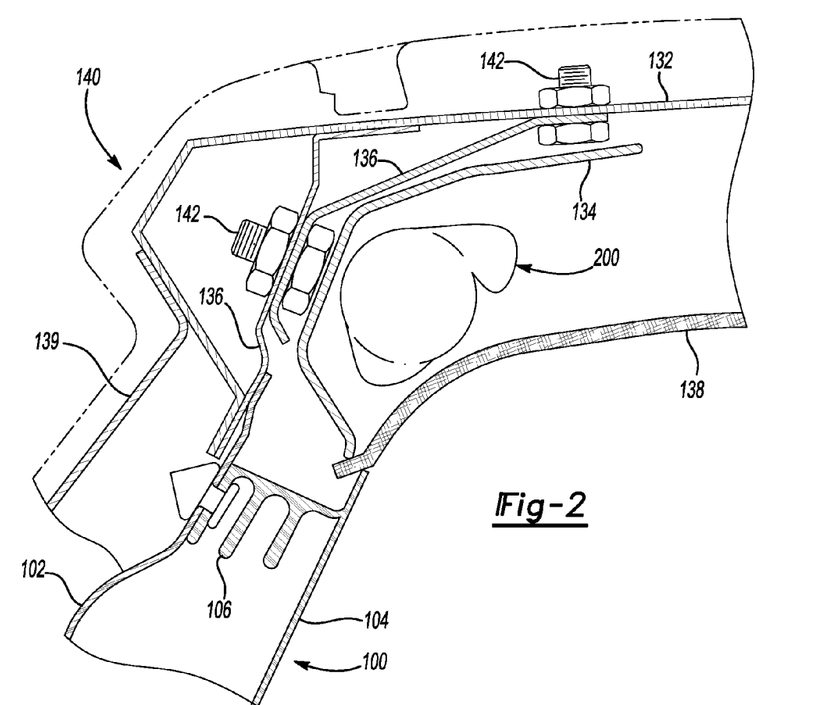
FIG. 2 is an end cross-sectional view of section 2-2 shown in FIG. 1.

Looking now at FIG. 2, an end cross-sectional view of the section labeled 2-2 shown in FIG. 1 is provided. The cross-sectional view shows the B-pillar 110 and the roof rail 140 with the side curtain-roof airbag 200 attached thereto. The B-pillar 110 has a B-pillar inner member 102 (hereafter referred to simply as "B-pillar inner") and an inner trim 104. Between the pillar member 102 and trim 104 is a trim attachment bracket 106. The roof 140 can have a roof bow 132 attached thereto, as can be a B-pillar outer 139 (hereafter referred to simply as "B-pillar outer"). Attached to the roof rail 140 can be a plurality of structural reinforcement members such as brackets 136, fasteners 142 and the like known to those skilled in the art. As such, it is appreciated that the roof rail 140 is stronger and/or stiffer than the adjoining and/or proximate roof, side windows, trim and the like of the motor vehicle. It is also appreciated that roof rail 140 can adjoin the B-pillar inner 102, roof bow 132 and brackets 136 using any type of fastener(s) known to those skilled in the art including adhesives, welds, rivets and threaded fasteners 142 as shown in the figure.

Other structural members can be included, such as a jump bracket 134 that aids in the deployment of the side curtain-roof airbag 200. Also shown is a headliner 138 which covers or hides the curtain airbag 200 from view.

Figure 3:
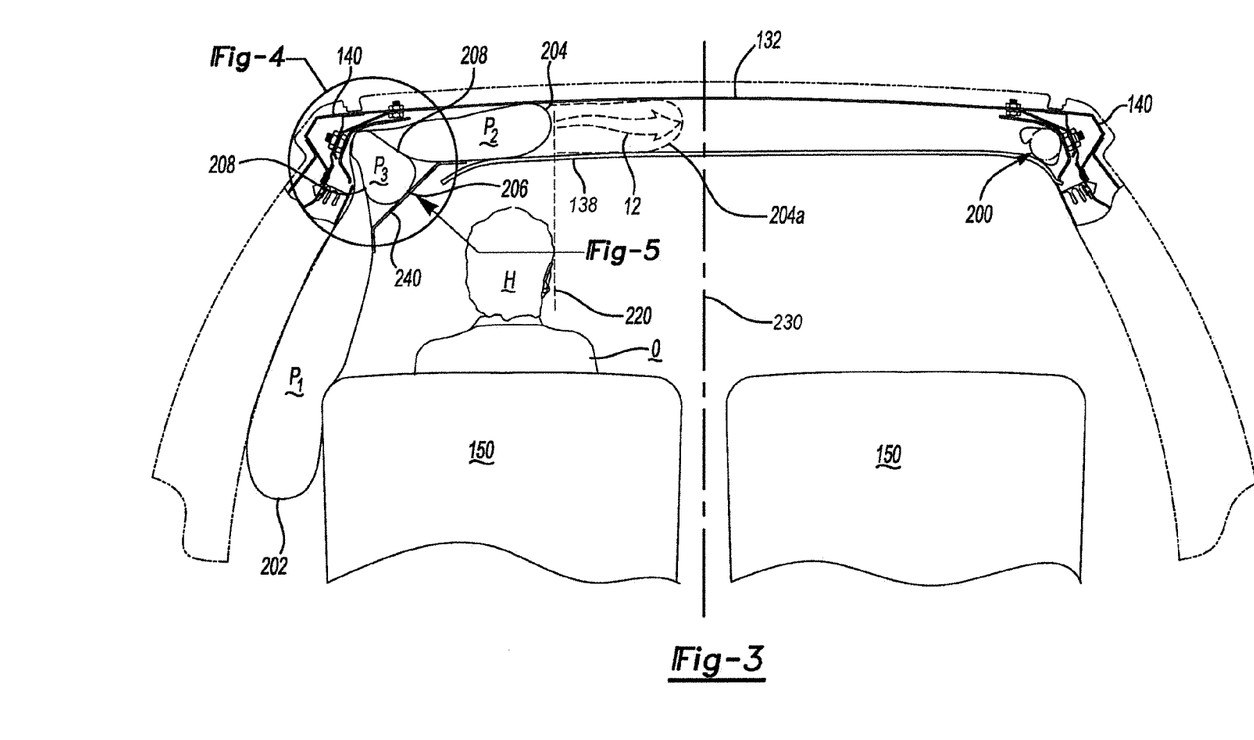
FIG. 3 is an end cross-sectional view of the side curtain-roof airbag in a deployed position according to an embodiment of the present invention.

Referring to FIG. 3, an end cross-sectional view of the side curtain-roof airbag 200 in a deployed position for one embodiment of the present invention is shown. As shown in the figure, the airbag 200 has a side chamber 202 (aka a side bag) that extends from the roof rail 140 in a downward direction along a side of the interior of the vehicle 10. Also, the airbag 200 has a roof chamber 204 (aka a roof bag) that extends along the roof in an inward direction from the rail towards a centerline 230 of the vehicle. Between the side chamber 202 and roof chamber 204 is a corner chamber 206 (aka a corner bag). The corner chamber 206 is separate from the side chamber 202 and the roof chamber 204 via a chamber wall 208. In addition, the corner chamber 206 is proximate and/or adjacent to the roof rail 140 and its plurality of structural reinforcement members.

The corner chamber 206 has an internal pressure $P_3$ therewithin that can be different than an internal pressure $P_1$ within the side chamber 202 and/or an internal pressure $P_2$ within the roof chamber 204, however this is not required. For example, the pressure within the side chamber ($P_1$), roof chamber ($P_2$) and corner chamber ($P_3$) can obey the following relationships when the airbag is deployed: $P_3>P_1$ and $P_3>P_2$; $P_3>P_1$ and $P_3=P_2$; $P_3>P_1$ and $P_3<P_2$; or $P_3=P_1=P_2$. Also, and for illustrative purposes only, one embodiment can afford for $P_3 \approx 1.5P_1$, or in the alternative, $P_3 \approx 2.0 P_1$.

The side curtain-roof airbag 200 has a tether 240 that bridges across the corner chamber 206 between the side chamber 202 and the roof chamber 204. The tether 240 can be attached to the corner chamber 206, side chamber 202 and/or roof chamber 204 via adhesives, fiber threading, clips, studded fasteners and the like.

FIG. 3 also shows an occupant 'O' sitting in a motor vehicle seat 150, the occupant having a head 'H'. In addition, the roof chamber 204 extends in the inward direction at least to an inner side of the head H referenced by the dotted line 220. Stated differently, the roof chamber 204 extends inwardly at least to the inner side of an individual's head when the individual is sitting normally within the seat located on the side of the motor vehicle 10 where the deployed side curtain-roof airbag 200 is located. In a preferred embodiment, the roof chamber 204 extends all the way over to a centerline 230 of the vehicle interior as illustrated by the dotted lines 204a and arrow 12. Also, the roof chamber 204 can extend above the headliner 138 and it is appreciated that the headliner 138 deforms during deployment of the side curtain-roof airbag as is known to those skilled in the art.

In another preferred embodiment, the roof chamber 204 extends and meets a roof chamber from another side curtain-roof airbag that is deployed. Stated differently, it is appreciated that both side curtain-roof airbags 200 shown in FIG. 3 can be deployed and that the roof chamber of each airbag 200 can meet and come into contact with each other and thereby cover the entire roof bow 132 of the vehicle 10.

Figure 4:
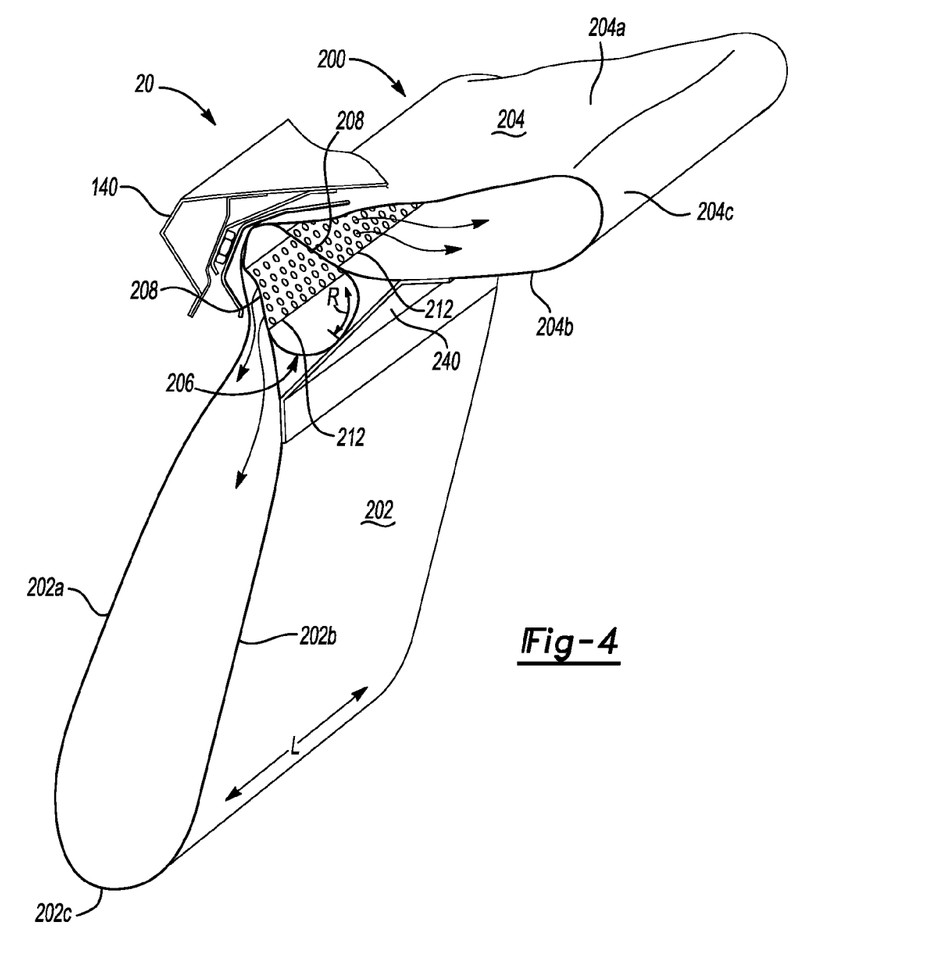
FIG. 4 is a perspective view of the side curtain-roof airbag in a deployed position according to an embodiment of the present invention.

Referring now to FIG. 4, a side perspective view of the side curtain-roof airbag 200 according to one embodiment is shown at reference numeral 20. It is appreciated that a cut-away portion is provided in order to illustrate the chamber wall 208 that separates the corner chamber 206 from the side chamber 202 and the roof chamber 204. The side chamber 202 has a first wall 202a, a second wall 202b and a bottom wall 202c extending therebetween. In this manner an enclosed side chamber 202 is provided. Similarly, the roof chamber 204 has a first wall 204a, a second wall 204b and an end wall 204c extending therebetween. In this manner, an enclosed roof chamber 204 is provided. Finally, the corner chamber 206 has at least one corner chamber wall 208 which may or may not be part of the second wall 202b and second wall 204b. Stated differently, a portion of the second wall 202b and second wall 204b can form the corner chamber wall 208, or in the alternative, the corner chamber wall 208 can be an extra layer of material adjacent to the second wall 202b and second wall 204b.

In any event, and for any given corner chamber wall 208 configuration, the at least one corner chamber wall 208, and optionally the second wall 202b and second wall 204b, can have a plurality of vents or apertures 212 that affords fluid communication between the corner chamber 206 and the side chamber 202 and roof chamber 204. In this manner, gas provided by actuator 201 can flow through the corner chamber 206 and pass in a controlled manner into the side chamber 202 and roof chamber 204. In addition, the corner chamber wall 208 with vents or apertures 212 afford for the pressure $P_3$ within the corner chamber 206 to be different than the pressure $P_1$ in the side chamber 202 and pressure $P_2$ in the roof chamber 204 as discussed above.

It is appreciated that although the corner chamber 206 shown in the figures has a single or continuous wall 208, this is not required, i.e. the corner chamber 206 could have a first wall, a separate second wall and/or a separate end wall that are, for example, sewn to each in order to provide the enclose corner chamber 206.

Figure 5:
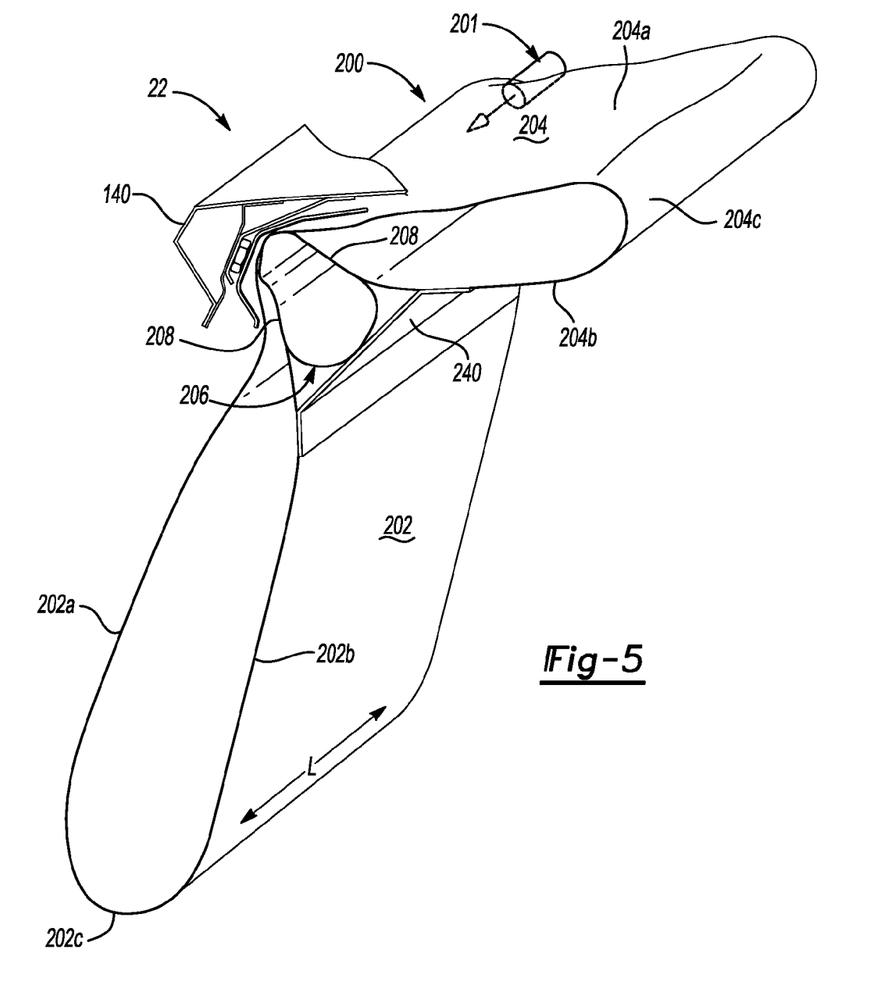
FIG. 5 is a perspective view of the side curtain-roof airbag in a deployed position according to another embodiment of the present invention.

The tether 240 extends in a radial direction R and bridges across the corner chamber 206. The tether 240 may or may not extend all the way to the side chamber 202 and/or the roof chamber 204. The tether 240 can be a continuous tether that extends along a length 'L' of the side curtain-roof airbag 200 along a longitudinal direction. In some instances, the tether 240 can extend greater than 50% of the length of the airbag 200. In the alternative, a plurality of tethers 240 can be included and located along the length of the airbag 200 as illustrated in FIG. 5. In any event, and wherever the tether 240 is located, the tether can form a continuous surface between the side chamber 202 and the roof chamber 204.

Turning now to FIG. 5, another embodiment is shown generally at reference numeral 22. The embodiment 22 is similar to the embodiment 20 shown in FIG. 4, except that the at least one chamber wall 208, and optionally the second wall 202b and second wall 204b, do not have vents or apertures. Instead, one or more inflators 201 directly inject gas into the side chamber 201, roof chamber 204 and corner chamber 206. It is appreciated that a single inflator 201 can supply gas to the side, roof and side chambers 202, 204, 206 via at least three outlet gas lines with at least one gas line directed to the side chamber 202, at least one gas line directed to the roof chamber 204 and at least one gas line directed to the corner chamber 206. In the alternative, a separate inflator, i.e. three inflators, can be used to supply gas to each of the side, roof and corner chambers 202, 204, 206. In another alternative, a first inflator supplies gas to the side chamber 202 and a second inflator supplies gas to the roof and corner chambers 204, 206, e.g. via at least two outlet gas lines with at least one gas line directed to the roof chamber 204 and at least one gas line directed to the corner chamber 206.

Figure 6:
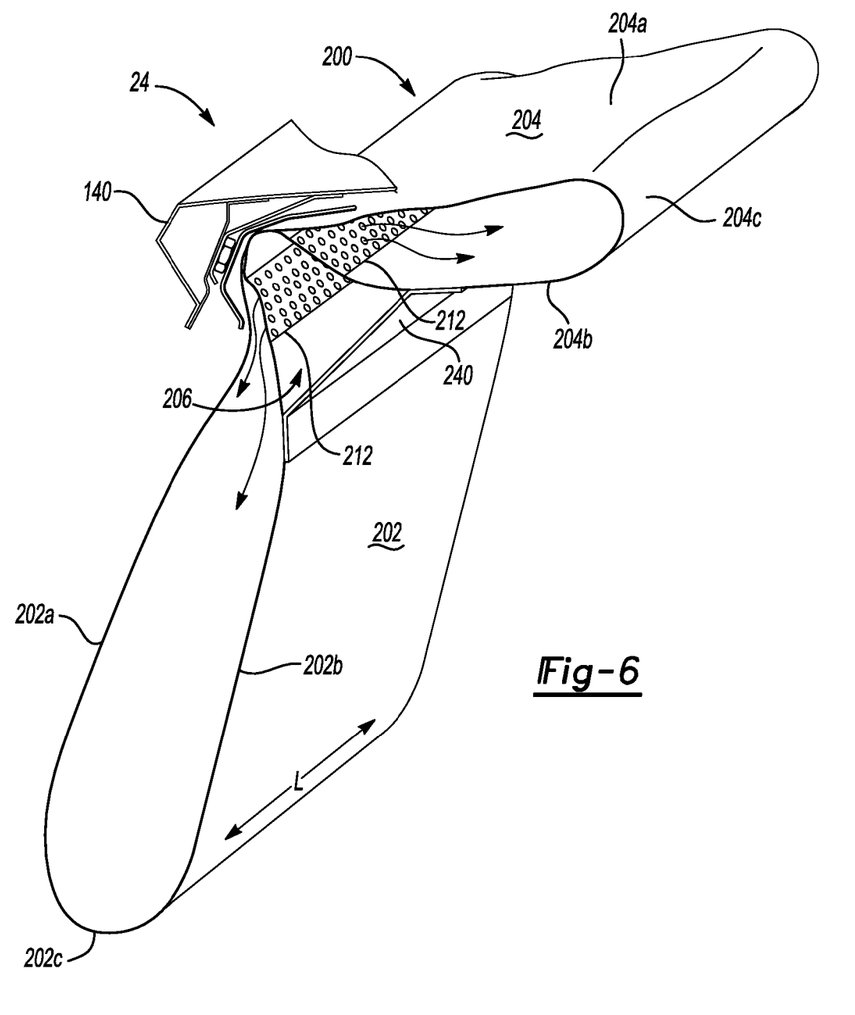
FIG. 6 is a perspective view of the side curtain-roof airbag in a deployed position according to yet another embodiment of the present invention.

With reference to FIG. 6, another embodiment is shown at reference numeral 24. The embodiment 24 is similar to the embodiment 20 shown in FIG. 4, except that the corner chamber 206 is formed by the tether 240 extending or bridging across or between the side chamber 202 an roof chamber 204 without the use or presence of the chamber wall 208. For example, the tether 240 can be attached to the side chamber second wall 202b and roof chamber second wall 204b, and thereby provide the corner chamber 206 as illustrated in the figure. In addition, the corner chamber second wall 204b and roof chamber second wall 204b have vents 212 and thus the side, roof and corner chambers 202, 204, 206 are filled with gas in a similar manner as illustrated and discussed for embodiment 20 above.

Figure 7:
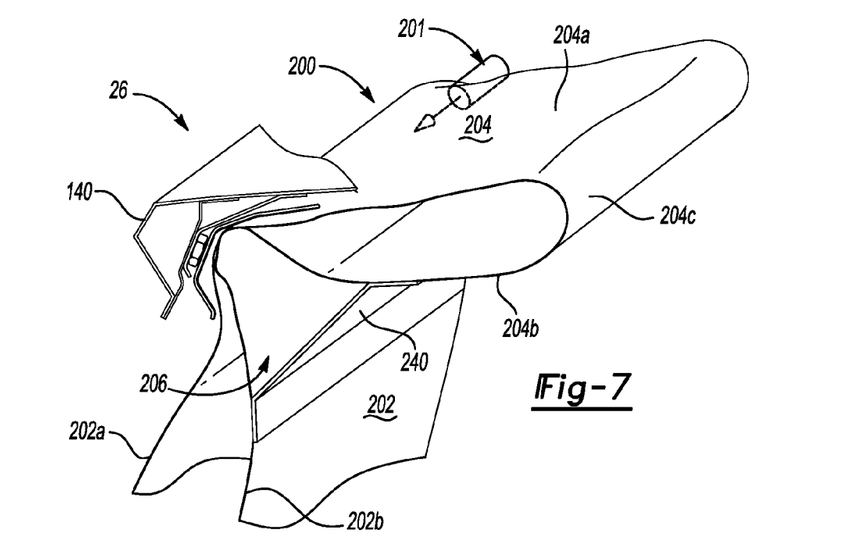
FIG. 7 is a perspective view of the side curtain-roof airbag in a deployed position according to still yet another embodiment of the present invention.

In still another embodiment shown at reference numeral 26, FIG. 7 illustrates the corner chamber 206 formed by the tether 240 bridging across the side chamber 202 and roof chamber 204. However, the side chamber second wall 202b and roof chamber second wall 204b do not have vents therein and the side, roof and corner chambers 202, 204, 206 are filled with gas in a similar manner as illustrated and discussed for embodiment 22 above.

Figure 8:
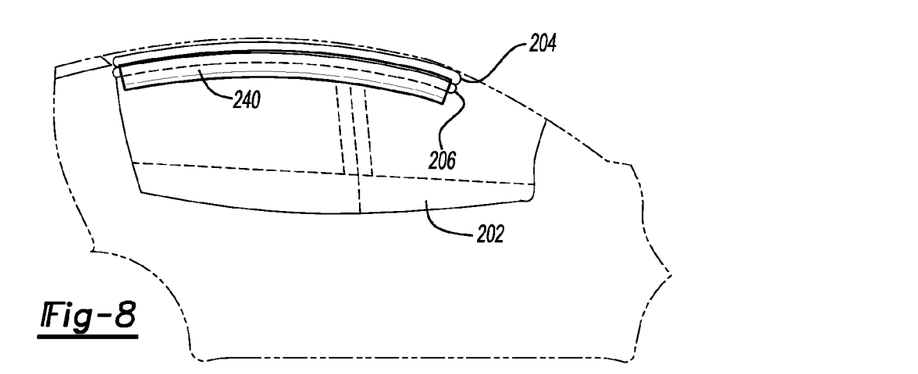
FIG. 8 is a side view of the side curtain-roof airbag illustrating a single tether according to an embodiment of the present invention.
Figure 9:
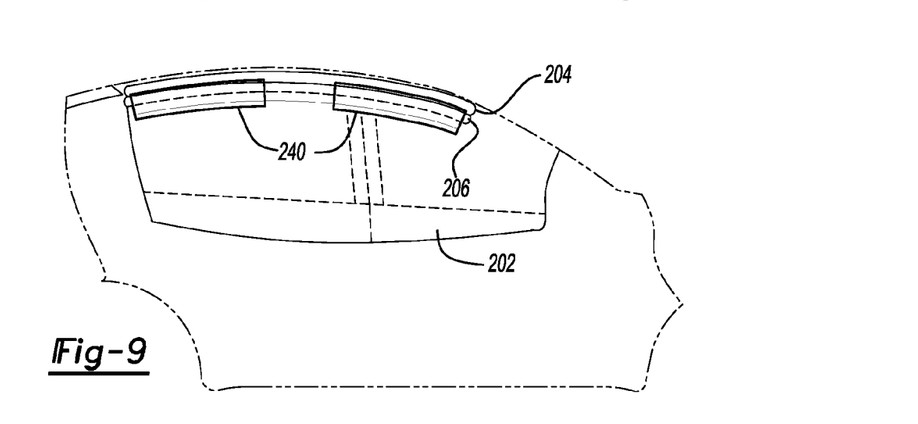
FIG. 9 is a side view of the side curtain-roof airbag illustrating a plurality of tethers according to another embodiment of the present invention

As noted above, the tether 240 can be a continuous tether that extends along a length 'L' of the side curtain-roof airbag 200 along a longitudinal direction. In some instances, a single tether 240 can extend greater than 50% of the length of the airbag 200 as illustrated in FIG. 8. In the alternative, a plurality of tethers 240 can be included and located along the length of the airbag 200 as illustrated in FIG. 9. In any event, and wherever the tether 240 is located, the tether can provide or form a continuous surface between the side chamber 202 and the roof chamber 204.

The side curtain-roof airbag disclosed herein can be made from any material known to those skilled in the art, for example woven nylon fabric.

It is appreciated that the embodiments discussed above are for illustrative purposes only and are not meant to limit the scope of the invention in any way. Changes, modifications, and the like will be apparent to those skilled in the art and yet still fall within the scope of the invention. As such, the scope of the invention is defined by the claims and all equivalents thereof.

We claim:

1. A side curtain-roof airbag for a motor vehicle, said side curtain-roof airbag comprising:
   a side chamber;
   a roof chamber;
   a corner chamber located separate from said side chamber and said roof chamber, said corner chamber located between said side and roof chambers when said side curtain-roof airbag is in a deployed position; and
   a tether extending across said corner chamber and between said side and roof chambers, said tether maintaining a desired shape of said corner chamber when said side curtain-roof airbag is in said deployed position.

2. The side curtain-roof airbag of claim 1, wherein said corner chamber is separate from said side and roof chambers via a corner chamber wall.

3. The side curtain-roof airbag of claim 2, wherein said corner chamber has an internal pressure that is different than internal pressures within said side and roof chambers when said side curtain-roof airbag is in said deployed position.

4. The side curtain-roof airbag of claim 3, wherein said corner chamber internal pressure is at least 1.5 times greater than a side chamber internal pressure.

5. The side curtain-roof airbag of claim 4, wherein said tether extends in a radial direction between said side and roof chambers.

6. The side-curtain airbag of claim 5, wherein said tether is a plurality of tethers, each of said plurality of tethers extending in a radial direction between said side and roof chambers.

7. The side curtain-roof airbag of claim 5, wherein said tether is a single tether that extends at least 50% of a length of the side curtain-roof airbag in a longitudinal direction.

8. The side curtain-roof airbag of claim 7, wherein said tether forms a continuous surface between said side and roof chambers along said at least 50% of said length of said side curtain-roof airbag in said longitudinal direction.

9. The side curtain-roof airbag of claim 8, further comprising a motor vehicle, said side curtain-roof airbag installed within and extending from a forward-most pillar to a rearward-most pillar of said motor vehicle.

10. The side curtain-roof airbag of claim 1, wherein said corner chamber is in fluid communication with said side and roof chambers via a plurality of vents within said corner chamber wall.

11. The side curtain-roof airbag of claim 1, wherein said roof chamber extends inwardly at least to a position vertically above an inner side of an occupant's head for an occupant sitting in a normal position of said motor vehicle when said side curtain-roof airbag is in said deployed position.

12. The side curtain-roof airbag of claim 11, wherein said roof chamber extends generally to a centerline of said motor vehicle when said side curtain-roof airbag is in said deployed position.

13. The side curtain-roof airbag of claim 12, further comprising a jump bracket, said jump bracket guiding said roof chamber inwardly during deployment of said side curtain-roof airbag.

14. A motor vehicle with a side curtain airbag, said motor vehicle comprising:
   a frame;
   a side curtain-roof airbag attached to said frame, said side curtain-roof airbag having a side chamber, a roof chamber and a corner chamber located between said side and roof chambers when said side curtain-roof airbag is in a deployed position; and
   a tether extending radially between said side and roof chambers, said tether maintaining a desired shape of said corner chamber when said side curtain-roof airbag is deployed.

15. The motor vehicle of claim 14, wherein said corner chamber is separate from side chamber and said roof chamber via a corner chamber wall.

16. The side-curtain airbag of claim 15, wherein said tether is a plurality of tethers, each of said plurality of tethers extending in a radial between said side and roof chambers.

17. The side curtain-roof airbag of claim 16, wherein said tether is a single tether that extends at least 50% of a length of the side curtain-roof airbag in a longitudinal direction and forms a continuous surface between said side and roof chambers.

18. The motor vehicle of claim 17, wherein said corner chamber is in fluid communication with said side and roof chambers via a plurality of vent apertures within said corner chamber wall.

* * * * *